United States Patent [19]
Coe

[11] 3,980,329
[45] Sept. 14, 1976

[54] MANHOLE COVER LOCK
[75] Inventor: Donald K. Coe, Albuquerque, N. Mex.
[73] Assignee: Loc-Coe, Alburquerque, N. Mex.
[22] Filed: Apr. 28, 1975
[21] Appl. No.: 572,698

Related U.S. Application Data
[63] Continuation-in-part of Ser. No. 498,334, Aug. 19, 1974, Pat. No. 3,921,494.

[52] U.S. Cl. ............................ 292/258; 292/212; 292/256.67
[51] Int. Cl.² .......................................... E05C 19/18
[58] Field of Search .............. 292/212, 256.67, 258, 292/288; 85/3

[56] References Cited
UNITED STATES PATENTS

| | | | |
|---|---|---|---|
| 699,580 | 5/1902 | Scrivens | 292/212 X |
| 1,473,986 | 11/1923 | Brown | 292/200 X |
| 1,750,812 | 3/1930 | Netschert | 292/212 |
| 1,756,185 | 4/1930 | Folck | 292/258 |
| 2,926,026 | 2/1960 | Matteson | 85/3 R X |
| 3,248,994 | 5/1966 | Mortensen | 85/3 R |

Primary Examiner—Richard E. Moore
Attorney, Agent, or Firm—Townsend and Townsend

[57] ABSTRACT

A manhole cover lock is provided employing two units diametrically situated and extending through openings in the manhole cover. The units engage a projection of the manhole cover housing to prevent the removal of the manhole cover when the units are in position. The units comprise a cylindrical body having a yoke at one end, a locking plate pivotally mounted in the yoke, with a flanged face opposite the yoke, and having a central recess. Extending through the body is an eccentric bore, in which a rod is housed, cooperating with said locking plate to provide a dog lock. A threaded bolt having a keyed head is threaded into a threaded axial bore in said body to prevent axial movement of said rod. An alternate embodiment of the threaded bolt includes modification of the head of the threaded bolt to allow the head to receive a special wrench for firmly tightening the threaded bolt thereby additionally securing the manhole lock in position.

8 Claims, 12 Drawing Figures

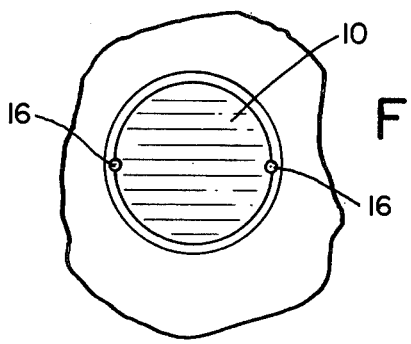
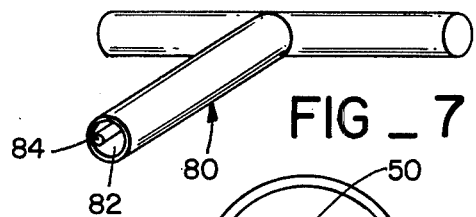
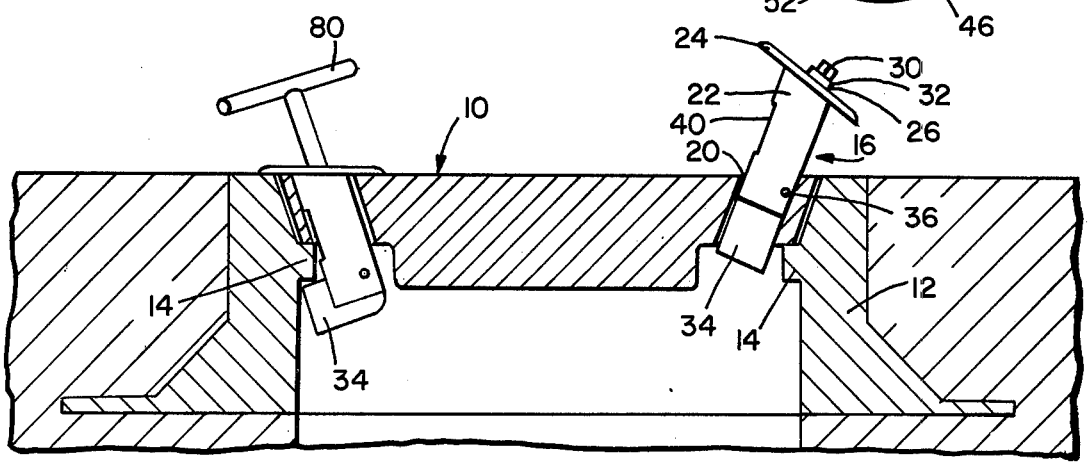
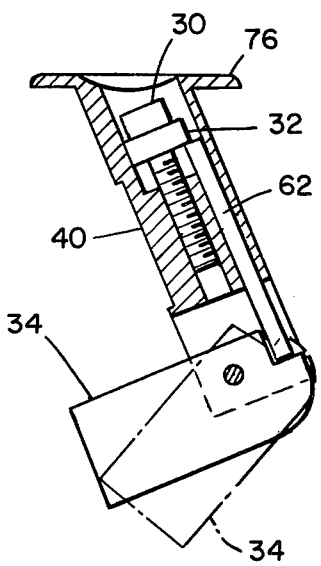
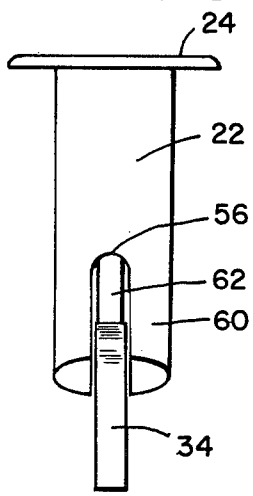
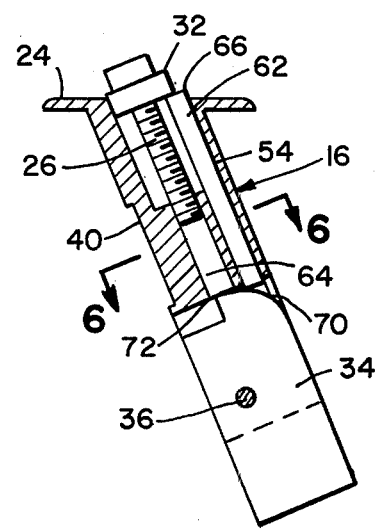
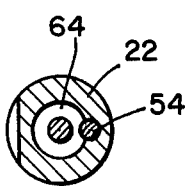

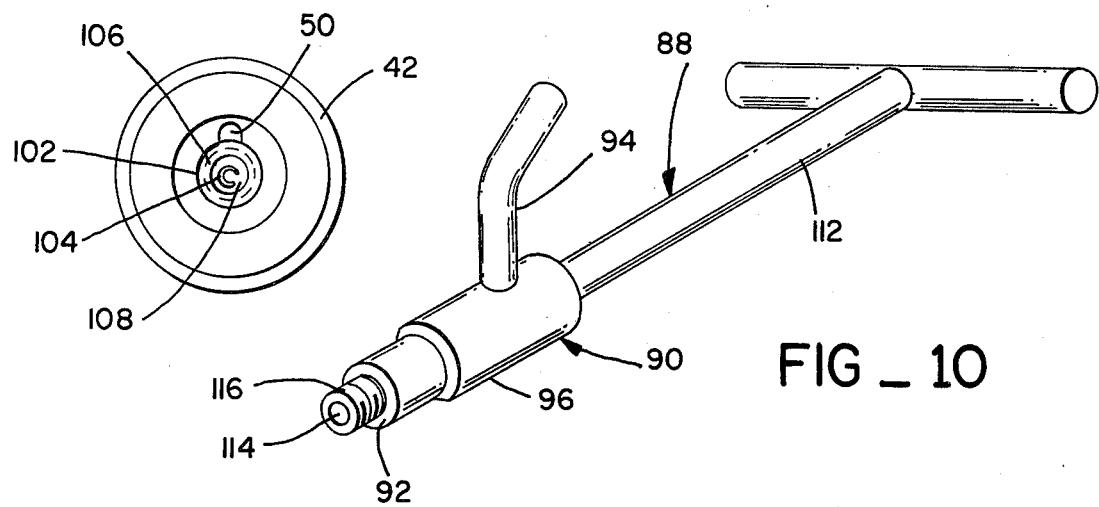
FIG_9
FIG_10
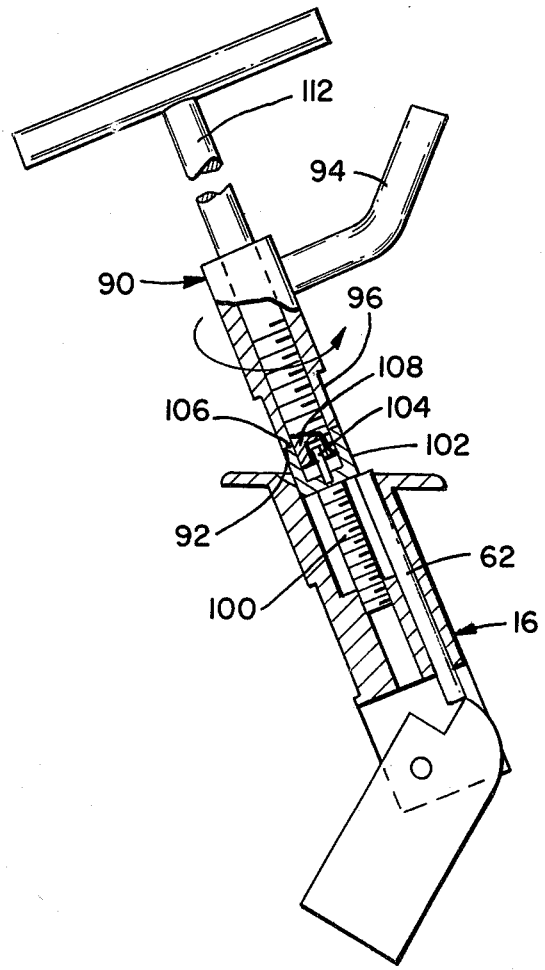
FIG_12
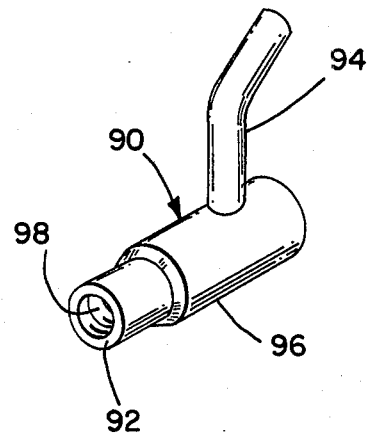
FIG_11

MANHOLE COVER LOCK

CROSS-REFERENCES TO RELATED APPLICATIONS

This is a Continuation-in-Part of Application Ser. No. 498,334, filed Aug. 19, 1974, now U.S. Pat. No. 3,921,494.

BACKGROUND OF THE INVENTION

This invention relates to locking devices and particularly to locking devices for manhole covers.

It is not uncommon that substantial amount of communication equipment and cable are placed underground. Access to this equipment and cable is usually provided by manholes to allow authorized persons to operate and maintain such underground equipment and cable. In order to prevent unauthorized persons from gaining access to such equipment and interfere with the proper operation thereof or use the equipment in an unauthorized manner, the access openings, or manholes, have been provided with manhole covers of substantial weight. Unfortunately, despite their heavy weight, such unauthorized entry has not been altogether prevented. Further, manhole covers are, at times, an object of theft. By locking manholes, unauthorized entry and manhole cover theft can be minimized.

SUMMARY OF THE INVENTION

A strong, simple, economic manhole cover lock is provided having a cylindrical body with a yoke at one end in which a locking plate is pivotally mounted. The other end of the body has a flanged face at an oblique angle to the axis of said body with a central recess. A first bore eccentrically situated, extends through said housing, from the recess to the top of the yoke. A rod in the first bore cooperates with the locking plate to provide a dog lock. A threaded bolt is threaded into a threaded axial bore in the body. The threaded bore is situated adjacent to the first bore to allow the head to overlap the first bore, and prevent axial movement of the rod when the bolt is engaged in the threaded bore.

The threaded bolt is provided with a head that has two different embodiments. The first embodiment provides a keyed head requiring a wrench with an inset that conforms to the keyed head to thread (or unthread) the threaded bolt to lock (or unlock) the manhole cover lock. The second embodiment provides a head with an internally threaded recess. Concentrically mounted in the threaded recess of the head is a post providing a key means. The threaded bolt is tightened, to lock the manhole lock, by the cooperative use of a Tee-wrench and jamming device. The Tee-wrench is provided with an externally threaded base and recess designed to engage the internally threaded head of the threaded bolt. The jamming device has a cylindrically shaped body with an internal threaded concentric bore and an arm attached to, and extending away from, the body. In use, the Tee-wrench is threaded through the threaded bore of the jamming device so that a portion of the Tee-wrench base extends therefrom. The extended portion of the threaded base is threaded into the head of the threaded bolt and, in cooperation with the jamming device, the Tee-wrench is rotated to securely tighten the threaded bolt.

BRIEF DESCRIPTION OF THE SEVERAL VIEWS OF THE DRAWINGS

FIG. 1 is a vertical section of a manhole cover and housing having one locking unit in locking position, and a second locking unit, partially introduced into an opening in the manhole;

FIG. 2 is a top plan view of the locking unit;

FIGS. 3 and 4 are partial vertical sections of the locking unit in locked and unlocked positions respectively;

FIG. 5 is a side view of the locking unit;

FIG. 6 is a cross section view along line 6—6 of FIG. 4;

FIG. 7 is a perspective view of a locking wrench employed with a locking unit having a threaded bolt with a keyed head;

FIG. 8 is a plan view of a manhole cover with the locking units in place;

FIG. 9 is a top plan view of a locking unit depicting the alternate embodiment of the threaded bolt;

FIG. 10 is a perspective view of the locking wrench used with the alternate embodiment of the threaded bolt depicting the Tee-wrench with the jamming device threaded thereon;

FIG. 11 is a perspective view of the jamming device; and,

FIG. 12 is a partial vertical section of the locking unit.

DESCRIPTION OF THE SPECIFIC EMBODIMENTS

An apparatus is provided for locking manhole covers to prevent unauthorized intrusion into the manhole area. A minimum of two locking units is required, although more than two may be used. Each locking unit or assembly has a cylindrical housing or body, having a partially recessed angled face at one end and a yoke or U-shaped member at the other end.

Extending from the angled face in planar relationship is a flange, which serves as a strike plate, the flange lying flat on the manhole cover surface when the locking unit is in position. The throat of the yoke defines a central plane through the housing axis intersecting the highest and lowest points of the flange.

Pivotally mounted in the yoke member is a locking plate, which is notched at one corner and engages the bottom of the throat of the yoke, so as to be in axial alignment with the body or housing, when the locking unit is introduced through the opening of the manhole cover. Conveniently, the locking plate is mounted on a cross rod in the yoke at other than its center of gravity.

The body or housing has two aligned or parallel bores substantially parallel to the axis of the housing. The first bore serves as a guide and slidably contains a control push pin or rod which cooperatively co-acts with the locking plate to form a locking dog, pressing into the notch in the plate, so as to position the locking plate laterally from the housing. The second bore, which is optionally and conveniently axially located in the housing, is threaded to receive a threaded bolt having a keyed or notched head and having a thrust bearing, which overlaps at least a portion of the first bore, so as to lock the pin or rod in position preventing axial movement. The alternate embodiment of the threaded bolt is without the thrust bearing. Rather, the head of the threaded bolt itself is modified to overlap and press down on the push pin when tightened into the threaded bore. The head of the threaded bolt is provided with an internally threaded recess. Concentrically located in the threaded recess of the head is a post, the top of which is approximately flush with the top of the head. An index or notch is provided in the housing on the side adjacent the upper end of the angled face.

A wrench is provided having an inset, which conforms to the keyed head, for threading the bolt into the threaded bore and locking the pin or rod in locked position.

Utilized in the alternate embodiment is a locking wrench comprising a Tee-wrench and a jamming device cooperatively used for securely threading (or unthreading) the bolt into the threaded bore of the lock. The base of the Tee-wrench is recessed and externally threaded so that engagement of the threaded head of the threaded bolt is possible. The jamming device is comprised of a cylindrically shaped body with an internally threaded concentrically located bore and an arm connected to the body and extending away therefrom. In use, the wrench is threaded through the body of the jamming device with a portion of the base extending beyond said body for engaging the threaded bolt. Cooperative use, explained in detail below, of the jamming device with the Tee-wrench securely tightens the threaded bolt in the threaded bore for locking.

The manhole cover has openings which angle inwardly. When introducing the locking assembly into the manhole cover, the assembly is introduced with the notch toward the center of the manhole cover. The locking plate is then naturally positioned in axial alignment with the housing. When the locking plate has passed beyond the bottom of the manhole cover, the housing is twisted around so that the index is directed toward the periphery of the manhole cover and the flange or strike plate will lie flush with the manhole cover surface. The keyed head bolt may now be tightened into the threaded bore, so that the thrust bearing presses down on the push pin, which engages the locking plate notch, pivoting the locking plate at an angle substantially parallel to the strike plate and engaging the rim of the manhole cover housing or ring. By locking two diametrically positioned units, the manhole cover is effectively locked into position and can only be removed by someone having an appropriate wrench, so as to loosen or remove the bolt to release the push pin.

For further understanding of the invention, the drawings will now be considered.

In FIG. 1, a manhole cover 10 is situated in manhole ring 12, which has an annular projection 14. A manhole lock 16 is depicted in the process of being introduced through an opening 20 in the manhole cover 10.

The manhole cover lock 16 has a cylindrical body 22, strike plate 24, and threaded bolt 26 with keyed head 30. Slidably mounted on threaded bolt 26 is thrust bearing 32. Locking plate 34 is pivotally mounted on pin 36, and as the locking unit is introduced into the manhole cover opening, is in axial alignment with cylindrical body 22. A notch or index 40 is directed toward the center of the manhole cover 10.

For further details concerning the locking unit, FIGS. 2 to 6 will be considered.

In FIG. 2, the circular strike plate has a curved edge 42. The upper face 44 of the body 22 has a recess 46 with bore opening 50. With threaded bolt 26 in position, the thrust bearing 32, overlaps a portion of bore opening 50.

In FIG. 4, the locking unit 16 is shown in the unlocked position. Extending through the body 22 is axially displaced bore 54, which extends from the recess 46 to the top 56 of yoke 60. A push pin 62 is slidably housed in said axially displaced bore 54. A substantially axial threaded bore 64 receives in threaded engagement, bolt 26, on which thrust bearing 32 is slidably mounted. The bottom surface of thrust bearing 32 rests on the top 66 of push pin 62, when the manhole cover lock 16 is in the unlocked position.

Locking plate 34 is pivotally mounted on pin 36 with a curved contoured end portion 70 engaging push pin 62 in the unlocked position. The tip 72 of the curved end portion 70 encounters the top of the yoke 56 preventing free rotation of the plate 34.

In FIG. 3, the manhole lock is depicted in the locked position, with the broken line indicating the positions of the push pin 62, thrust bearing 32, and threaded bolt 26 in the unlocked position, with the notch 40 directed toward the periphery of the manhole cover 10.

As the lock is turned in position, once the locking plate 34 has cleared the manhole cover, the weight of the plate 34 will position the plate at an angle to the axis of the body 22, so that the plate hangs under the projection 14. The threaded bolt 26 is tightened so that thrust bearing 32 engages push pin 62, forcing push pin 62 against notch face 74. Plate 34 moves laterally from body 22, so as to engage projection 40 in the locked position. The major portion or entire bolt head 30 is below the top surface 76 of strike plate 24 in the locked position. The manhole lock 16 is depicted in FIG. 1 in the locked position with Tee-wrench 80 engaging the keyed head 30.

A Tee-wrench is employed having a recess 82 with post 84, which conforms with notch 52 in the keyed head 30. The wrench is used to tighten the threaded bolt 26 and lock the manhole lock in position.

FIGS. 9–12 illustrate the alternate embodiment of the threaded bolt and the locking wrench used therewith.

Referring to FIGS. 9 and 12, the manhole cover lock 16 has replaced for the threaded bolt 26 the threaded bolt 100 having the bolt head 102 thereon. The bolt head 102 has a threaded recess 108 and a post 104 concentrically mounted in the threaded recess 108. The threaded recess 108 of bolt head 102 is adapted to receive the threaded base of Tee-wrench 112 of the locking wrench.

In FIG. 10, the locking wrench 88 for the alternate embodiment is shown. The locking wrench is comprised of the Tee-wrench 112 and a jamming device 90. The Tee-wrench 112 has a threaded base 116 and a recess 114 designed to engage the bolt head 102 of the threaded bolt 100. FIGS. 10 and 11 show the jamming device 90 which comprises a cylindrically shaped body 96 having an axially aligned and internally threaded bore 98 therethrough. An arm 94 is affixed to the body 96 and extending therefrom. At the bottom of the body 96 is jamming face 92 for engaging the annular head face 106 located on threaded bolt 100.

Referring now to FIG. 12, operation of the locking wrench 88 to tighten the alternate embodiment threaded bolt 100, thereby locking manhole cover lock 16, can now be described. Tee-wrench 112 is first threaded into, and through, the threaded bore 98 of the jamming device 90 such that a portion of the threaded base 116 extends below the jamming face 92 of the jamming device 90, as indicated in FIG. 10. This extended portion of the threaded base 116 is then threaded into threaded recess 108 of the bolt head 102 of threaded bolt 100 in a clockwise direction. The jamming device 90 is then rotated clockwise until the jamming face 92 of the body 96 securably engages the bolt top 106 of threaded bolt 100 as shown in FIG. 12. The locking wrench 88 is then rotated in a clockwise direction to thread the threaded bolt 100 into the body 22 of the manhole cover lock 16. Cooperative use of the tee-wrench 80 and jamming device 90 allow the threaded bolt 100 to be securely tightened in place.

Once the locking wrench has been used to tighten threaded bolt 100, thereby locking the manhole cover lock 16 as shown in FIG. 12, the disengagement of the locking wrench 88 may now be described. While securely holding the Tee-wrench 112 from rotation, jamming device 90 is rotated in the counter-clockwise direction, preferably one full turn, thereby disengaging jamming face 92 from head face 106. Tee-wrench 112 in then rotated counterclockwise until the threaded base 116 becomes unthreaded from the threaded recess 108 of the bolt head 102, thereby disengaging the locking wrench 88 from the bolt head 102.

Unlocking the manhole cover lock 16 is performed by threading that portion of the thread base 116, extending below the jamming device 90, again into the threaded recess 108. The jamming device 90 is rotated clockwise until the jamming face 92 securely engages the bolt head top 106. The Tee-wrench is then rotated in a counterclockwise direction to effect removal of the threaded bolt 100, thereby freeing the push pin 62 and unlocking the manhole cover lock.

At least two manhole locks are required, as depicted in FIG. 8, and are conveniently diametrically positioned. Once the threaded bolt 26 (or 100) is tightened, the manhole lock 16 locks the manhole 10 in position, so that only a wrench having the prescribed configuration can be used to release the manhole.

It is found that the flange or strike plate 24 should be set at about 20 degrees from the normal to the axis of the body. At this angle, the locking plate 34 readily assumes an appropriate angle, when the lock is introduced into the manhole cover opening, and turned with the notch directed to the outer portion of the manhole. By tightening the threaded bolt and pushing the push pin against the locking plate, the locking plate moves upward against the projection of the manhole ring, locking the entire assembly.

The subject invention provides a convenient and simple means for locking manholes, so as to prevent their removal or unauthorized intrusion into the manhole. A special wrench with either embodiment is required in order to release the manhole cover, once the manhole locks are in position.

Although the foregoing invention has been described in some detail by way of illustration and example for purposes of clarity of understanding, it will be obvious that certain changes and modifications may be practiced within the scope of the appended claims.

What is claimed is:
1. A manhole cover lock comprising:
a cylindrical housing having an angled face at one end with a co-planar flange extending therefrom, and a yoke at the other end;
a first axial displaced longitudinal bore extending through said housing;
a second threaded longitudinal bore adjacent and parallel said first bore;
A control rod slideably housed in said first bore;
a locking plate having a first end shaped for engagement of said control rod, pivotally mounted in said yoke, and having a longitudinal portion extending substantially laterally of said housing in the direction of the upper end of said angled face when said control rod is engaged therewith;
threaded locking means threaded in said second bore having an uppermost projecting portion extending over said first bore for causing said control rod to be axially disposed to engage and position said locking plate laterally from said housing in a locked condition and to prevent axial movement of said control rod when said manhole lock is in a locked position; and,
a recess in said upper face to allow said projecting portion to be disposed below said upper face to allow said projecting portion to be disposed below said upper face so that said threaded locking means is contained within said housing when said manhole cover is in the locked condition.

2. A manhole cover lock according to claim 1, wherein said threaded locking means is a threaded bolt and said projecting portion comprises a keyed bolt head and thrust bearing slideably mounted on said bolt.

3. A manhole cover lock assembly according to claim 2, in combination with a locking wrench comprising:
an elongate member having at one end thereof keying means engageable with and removably coupled to said keyed bolt head; and
a handle connected to the opposite end of said elongate member.

4. A manhole cover lock according to claim 1, wherein said threaded locking means is a threaded bolt and said projecting portion comprises a bolt head having an axial internally threaded recess and a post mounted in said threaded recess.

5. A manhole cover lock assembly according to claim 4, in combination with a locking wrench for locking said manhole cover lock, said locking wrench comprising:
a first member having a cylindrical body with an axially displaced internally threaded longitudinal bore extending therethrough;
an arm fixedly connected to said housing and extending laterally therefrom; and
a Tee-wrench having an elongate member, said elongate member having one end removably coupled to said bolt head, said end including an axially disposed recess and external threads, the number of said threads being sufficient to allow said elongate member to be threaded through said cylindrical body with a portion of said threaded end of said elongate member extending beyond said cylindrical body sufficient to engage said bolt head, and a cross-bar handle connected to said elongate member at the end opposite said threaded end.

6. A manhole cover lock according to claim 1, wherein said first end has a notch and a contoured circular segment which engages said housing, so that said locking plate is in axial alignment with said housing when said manhole cover lock is in the unlocked condition.

7. A manhole cover lock according to claim 1, wherein said flange is an annular plate.

8. A manhole cover lock according to claim 1, including: an index means on the side of said housing adjacent the upper end of said upper face.

* * * * *